Feb. 1, 1944.  G. F. RACKETT  2,340,684

CINEMATOGRAPHIC FILM EXPOSURE

Filed Feb. 3, 1942

Inventor
Gerald F. Rackett
by Roberts, Cushman & Woodbury
his Attys.

Patented Feb. 1, 1944

2,340,684

UNITED STATES PATENT OFFICE 2,340,684

CINEMATOGRAPHIC FILM EXPOSURE

Gerald F. Rackett, Los Angeles, Calif., assignor to Technicolor Motion Picture Corporation, Hollywood, Calif., a corporation of Maine Application February 3, 1942, Serial No. 429,381

4 Claims. (Cl. 95—75)

In the art of cinematography it is often desirable to expose a film continuously throughout its length. One example is found in a printer where the films are fed continuously in contact with each other past a printing light. Another example consists in flashing negative film with infrared light to bring underexposed film up to normal speed, as disclosed in Patent 2,220,882. Still another example is in a Kodachrome or other reversal process involving a reexposure of the film between stages of the development process. In such processes the exposure lamp burns out from time to time, resulting in the loss of a large amount of film. In cases where the film carries an original image exposed in a camera, as in the aforesaid second and third examples, the film can be replaced only by rephotographing the action. This is frequently impossible and in any event it results in a large financial loss.

Objects of the present invention are to provide apparatus which avoids this loss, which provides continual exposure of substantially uniform intensity notwithstanding the failure of an exposure lamp, which is simple and economical to produce and which is durable and reliable in service.

According to the present invention two lamps are provided, a service lamp for normally exposing the film at one location along its path and an emergency lamp for exposing the film at another location farther along its path, together with means responsive to the failure of the service lamp for energizing the emergency lamp, the distance between the two locations being correlated with the speed of the film so that exposure by the emergency lamp begins at substantially the place on the film where the exposure by the service lamp ends. In a more specific aspect the invention involves two circuits for the service and emergency lamps respectively, together with a double-throw switch having a service position for connecting a source of current to the service circuit and an emergency position for connecting the source to the emergency circuit, an electromagnet in the service branch for holding the switch in the service position and means for moving the switch to the emergency position when the service branch is opened by failure of the service lamp.

Figure 1:
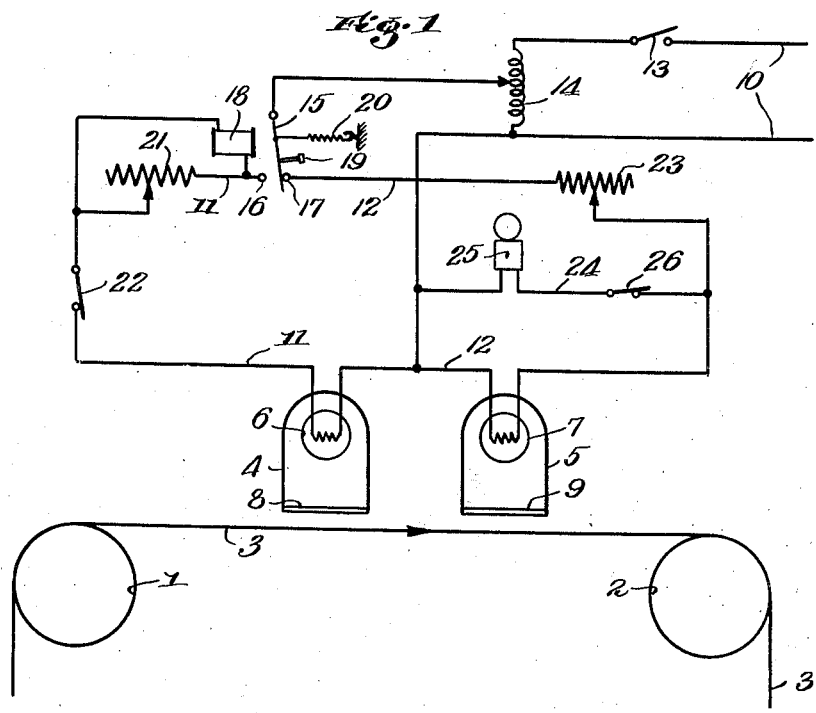
Figure 2:
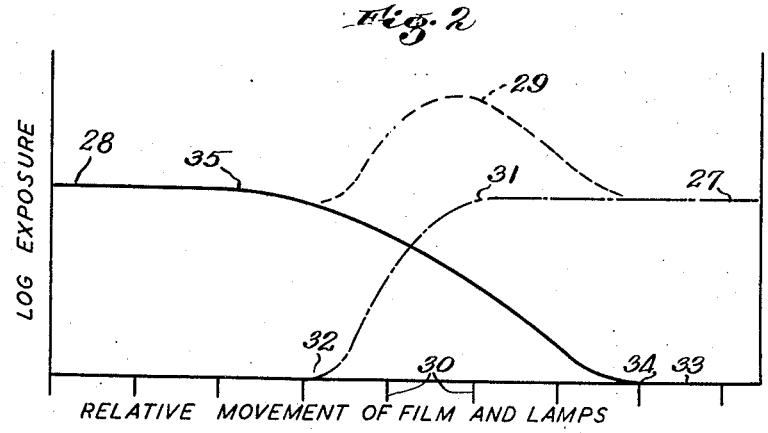

For the purpose of illustration a typical embodiment of the invention is shown in the accompanying drawing in which:

Fig. 1 is a diagrammatic representation of the apparatus and circuit arrangement, and Fig. 2 is a curve showing the degree of exposure of the film during the time when the service source is being replaced by the emergency source.

The particular embodiment of the invention chosen for the purpose of illustration comprises two guide rollers 1 and 2 over which the film 3 is fed in the direction of the arrow. Disposed above the horizontal path of the film are two light houses 4 and 5 containing the lamps 6 and 7, the bottom openings in the housings being covered with suitable filters 8 and 9. As the film travels under the housings 4 and 5 it is exposed continuously by the light from one of the lamps 6 and 7. Normally the film is exposed by the lamp 6, and when it burns out the current is automatically switched to the lamp 7.

In the illustration the circuit for energizing the two lamps comprises a main line 10 leading from a suitable source of current and two branches 11 and 12 connected to the main line. The main circuit comprises a switch 13 for disconnecting current from all parts of the apparatus and a variable transformer 14 for adjusting the voltage of the current supplied to the lamps. The main circuit 10 may be selectively connected with either of the branch circuits by means of a double-throw switch 15 having a service contact 16 and an emergency contact 17. An electromagnet 18 is connected in the service branch 11 to hold the switch 15 against the contact 16 after the switch has been moved to that position by the handle 19, and a spring 20 returns the switch 15 to the contact 17 when the magnet 18 is deenergized. Since the electromagnet requires considerably less current than the lamp it is bypassed by a variable resistance 21. For the purpose of testing the change-over operation a switch 22 is provided; when opened by hand this switch produces the same effect as the failure of lamp 6. The emergency branch 12 is provided with a variable resistance 23 in order to adjust the intensity of the light from lamp 7 to equal that from lamp 6. The branch 12 may also be provided with a sub-branch 24 containing a signal 25 to indicate when the lamp 7 has been substituted for the lamp 6 and a switch 26 to silence the bell while the rest of the film is being exposed.

By correlating the distance between the two lamps with the speed of the film, the exposure can be continued without interruption or abrupt change during the change-over period. With a distance of one and seven-eighths inches between the centers of the two exposure apertures and a film speed of twenty-one feet per minute, the variation in exposure during the change-over period is indicated schematically in Fig. 2. For the purposes of the graphical representation, the film may be conceived as stationary and lying along the abscissa, while the lamps move to the left relative to the film exposing the film to an extent indicated by the densities plotted as ordinates. The marks 30 along the abscissa indicate the location of the frame lines between picture spaces. Curve 27 indicates the density resulting from exposure by the service lamp 6, curve 28 represents the density resulting from exposure by the emergency lamp 7 and curve 29 represents the density resulting from both exposures during the change-over period. The exposure produced by the service lamp 6 is constant until the filament fails at point 31 and from there on the light intensity declines rapidly to zero at point 32. At the instant of service lamp failure the emergency lamp 7 is opposite the point 33 on the film. After a slight lag the lamp begins to admit light at point 34, the emergency light gradually increasing in intensity until a maximum is reached at point 35. While the total exposure produced by both lamps during the change-over period is somewhat greater than normal, the increase is not great enough to ruin even the three or four pictures which are subjected to it, and even if it were these few frames could be cut out without serious loss. In general, the peak of overexposure is reduced by reducing the spacing between lamps and the speed of the film.

It should be understood that the present disclosure is for the purpose of illustration only and that this invention includes all modifications and equivalents which fall within the scope of the appended claims.

I claim:

1. Apparatus for exposing cinematographic film as it is fed along a predetermined path, comprising a service lamp for exposing the film at one location along said path, an emergency lamp for exposing the film at another location farther along said path, and means responsive to the deenergization of the service lamp for energizing the emergency lamp, the distance between said locations being correlated with the speed of the film so that exposure by the emergency lamp begins at substantially the place on the film where the exposure by the service lamp ends.

2. Apparatus for exposing cinematographic film as it is fed along a predetermined path, comprising a service lamp for exposing the film at one location along said path, an emergency lamp for exposing the film at another location farther along said path, and means responsive to the deenergization of the service lamp for energizing the emergency lamp, the distance between said locations being correlated with the speed of the film so that exposure by the emergency lamp begins at substantially the place on the film where the exposure by the service lamp ends, said means comprising a circuit for each lamp, a switch in the emergency circuit and current-responsive means in the service circuit for controlling the switch.

3. Apparatus for exposing cinematographic film as it is fed along a predetermined path, comprising a service lamp for exposing the film at one location along said path, an emergency lamp for exposing the film at another location farther along said path, and means responsive to the deenergization of the service lamp for energizing the emergency lamp, the distance between said locations being correlated with the speed of the film so that exposure by the emergency lamp begins at substantially the place on the film where the exposure by the service lamp ends, said means comprising a circuit for each lamp, a switch in the emergency circuit, an electromagnet energized by current flowing through the service lamp for normally holding the switch open, and means for closing the switch when the electromagnet is deenergized.

4. Apparatus for exposing cinematographic film as it is fed along a predetermined path, comprising a circuit having a service branch and an emergency branch, a service lamp in the first branch for exposing the film at one location along said path, an emergency lamp in the other branch for exposing the film at another location farther along said path, a double-throw switch having a service contact for connecting a source of current to the service branch and an emergency contact for connecting the source to the emergency branch, an electromagnet in the service branch for holding the switch in the service position, and means for moving the switch to the emergency position when the service branch is opened by failure of the service lamp.

GERALD F. RACKETT.